March 19, 1957     H. W. WHITBY     2,786,172
LOW TEMPERATURE MOTOR STARTING ARRANGEMENT
Filed April 14, 1955

INVENTOR.
HARVIE W. WHITBY
BY
HIS ATTORNEYS

United States Patent Office 2,786,172
Patented Mar. 19, 1957

2,786,172

LOW TEMPERATURE MOTOR STARTING ARRANGEMENT

Harvie W. Whitby, Dayton, Ohio, assignor to Sprague Electric Company, North Adams, Mass., a corporation of Massachusetts Application April 14, 1955, Serial No. 501,315

6 Claims. (Cl. 318—221)

This invention relates to the starting of electric motors, more particularly induction motors that are operated by single phase alternating current and have a capacitor connected to assist them in getting started.

Among the objects of the present invention is the provision of novel starting arrangements that can be used at extremely low temperatures.

The above as well as additional objects of the present invention will be more clearly understood from the following description of several of its exemplifications, reference being made to the accompanying drawings wherein:

Figs. 1 to 4 inclusive are schematic circuit drawings of different embodiments of the invention.

Figure 5:
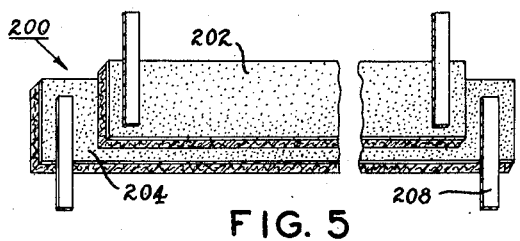

Fig. 5 is a partially unrolled showing of a capacitor available for use in this invention.

The use of capacitors to help in the starting of single phase induction motors has become quite popular inasmuch as the starting torque is thereby sharply increased as compared to that obtainable without the capacitor. This torque increase is provided at a relatively small cost inasmuch as the capacitors can be of the electrolytic type which furnish as much as several hundred microfarads at very small expense. Electrolytic capacitors also have a very small bulk so that they can be conveniently mounted in the motor base or on the housing, and no costly change in the motor construction is needed.

A feature of the present invention is that it enables the use of inexpensive types of electrolytic capacitors to start motors at temperatures as low as —65° C. or lower, even though such capacitors normally lose most of their capacitance when cooled to below about —10 to —20° C.

Figure 1:
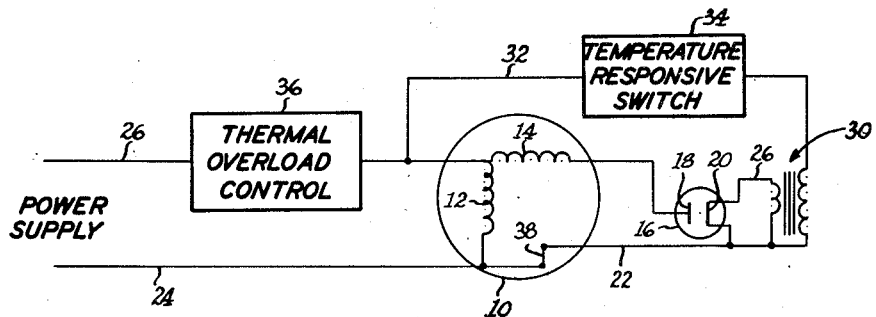

Referring now to Fig. 1 of the drawings, there is here shown in diagrammatic form an A. C. single phase induction motor 10 having a running winding 12 and a starting winding 14. An electrolytic capacitor, also diagrammatically represented, is shown at 16 as having two electrode strata 18, 20. This capacitor can be of conventional construction with each stratum in the form of an aluminum foil about 3 mils (0.003 inch) thick, two inches wide and about 20 inches long, by way of example. Each foil has its surface oxidized to aluminum oxide and both are convolutely wound together with porous spacers, the wound assembly being impregnated with an electrolyte such as those shown in U. S. Patent 2,444,725, granted July 6, 1948.

One electrode stratum 18 is connected to one end of starting winding 14 in any convenient manner. The other electrode 20 in the construction of Fig. 1 has leads at each end. These leads can be of the conventional staked tab form as shown in the above patent. One of these connections returns through line 22 to one terminal 24 of the power supply. The other end of electrode 20 is connected by line 26 to the output winding of a stepdown transformer 30. The transformer output circuit is completed by way of lead 22 to the first end of electrode 20. The input winding of transformer 30 is connected to the power supply conductors by way of lead 22 and an additional lead 32 in which there can be inserted, if desired, a temperature responsive switch 34. The usual type of thermal overload control 36 can be provided in the power supply circuit if it is desired to protect the motor against burnout from running overloaded. Where the capacitor 16 is only used to start the motor and not used for running it, the conventional type of centrifugal switch 38 can be connected to open up the starting winding circuit when the motor comes up to a suitable running speed.

When the construction of Fig. 1 is ready for operation and the power supply energized by closing a suitably provided starting switch (not shown), the motor will generally not start if it is at or below the above defined minimum temperatures. Under these conditions the capacitor 16 has a capacitance which is much smaller than normal, and since the current in the starting winding must pass through the normal capacitance to provide the required starting torque there may not be sufficient torque to start the motor rotating, with any appreciable load. However, the starting winding is normally constructed of such fine wire that the above current will often burn out this winding before the thermal overload control will open up the power circuit. The fine starting winding is conventionally used because in normal operation this winding draws current for only a few seconds to supply the torque necessary to bring the motor to a good running speed. Furthermore, the motors are generally made as compact as possible and there is accordingly no room for the insertion of the winding unless it is made of very fine wire. Accordingly currents of even 1/10 the magnitude drawn when in normal operation, will sometimes burn out the starting winding, although such current is not of sufficient magnitude by itself or in combination with the locked rotor current through the running winding 12 to trip the thermal overload control except after a protracted period of time.

The thermal overload control 36 normally responds to the temperature of the motor 10, or else to the temperature of a separate element that is separately heated by a heater placed in series in the motor energizing circuit. Either of these constructions will open up the power circuit when the motor frame or heater element becomes sufficiently hot. However, in cold weather particularly where the motor is cold, that is has not been running, this heating up might be delayed over a period much longer than the normal overload tripping period at higher ambient temperatures. The overload is arranged so that it does not respond to the normal warming up of the motor or to the normal energizing current that the motor uses when running properly. The thermal overload control is generally required to have an appreciable lag since it should not open the power supply circuit when the heavy starting current is drawn or even when the motor is temporarily overloaded.

In the apparatus of Fig. 1, however, the closing of the power supply circuit at low temperatures will energize the transformer 30 to supply heating current to capacitor electrode 20. By connecting the electrode as a heating resistance element with the heating current passing through it from one end to the other, the electrode will present an appreciable resistance so that good heating can be obtained. As much as several hundred watts can be developed in this way, and the capacitor can accordingly be heated up to normal capacitance in a fraction of a minute. As soon as there is sufficient warm-up, the current through the starting winding will automatically increase to provide the normal starting torque and the motor will start. When the motor comes up to the speed at which centrifugal switch 38 is automatically opened, the starting winding as well as the transformer 30 and the capacitor 20 is disconnected so that the motor will continue to operate in normal fashion. Where the motor is also arranged to operate at relatively high ambient temperatures, the switch 34 is desirable since it can very simply be provided as a bimetallic snap switch that automatically opens the heating circuit when the ambient temperature reaches some convenient level such as 0° C. This will keep the circuit from unnecessary heating up the capacitor 16 during hot weather for example. The switch 34 can also be arranged to automatically snap into position closing the heating circuit when the temperature drops to −5 or −10° C. for example. Even though the heating can then be supplied to the capacitor when it still has sufficient capacitance to effect immediate starting, this heat will not do any harm, merely raising the temperatures of the capacitor 10 or 20° C., since under these conditions the motor will start promptly, the heating period itself will be only a few seconds long.

A particularly effective form of capacitor for use with the present invention is one in which the electrode stratum to be heated has a higher than normal electrical resistance. Such an arrangement provides somewhat more effective heating since the heating currents can be made of lower amperage and the connection tabs need not be as carefully connected to the stratum. To this end the so-called "fabricated plate" type of capacitor such as that described in U. S. Patent 2,104,018 granted January 4, 1938, is particularly suited. The electrode strata as described in that patent are made by spraying a molten metal such as aluminum on a support where the molten metal droplets solidify to form a layer. There is an appreciable resistance between the particle thus solidified, particularly when compared to the resistance of a corresponding metal foil. The sprayed form of electrode is especially desirable when the spraying is on a porous non-conductive support such as cloth or gauze or the like.

Another desirable form of electrode construction is one that is relatively long as compared with its width, since this also increases its end-to-end electrical resistance. By way of example foils having a length-to-width ratio of 40 or more are very suitable for use in the combination of Fig. 1. Such an arrangement provides an electrical resistance about 5 or more times as high as electrodes having a normal length-to-width ratio.

Instead of using aluminum electrodes the capacitor can have one or both made of tantalum or titanium foil or solidified spray. Such metals have a much higher electrical resistance and more readily provide the desired heating.

If desired, the electrode strata of the capacitor 16 can be etched before their surfaces are converted into oxides. This etching is well known in the art and increases the effective area of the stratum so that even narrower widths can be used.

The capacitor 200 shown in Fig. 5 is suitable for use in this invention. The electrode strata 202 and 204 are of the fabricated plate type, that is they are produced by spraying molten metal onto a porous non-conductive support such as cloth or paper. The electrodes are of great length with respect to their width, in the order of at least 40 to 1, to provide a path of high end-to-end resistance, so as to bring the capacitor up to operating temperature in a relatively short time. Each composite electrode-dielectric 202 or 204 is provided with terminals 208 at both ends to permit use of either one or both strata as the resistance heater of this invention.

Figure 2:
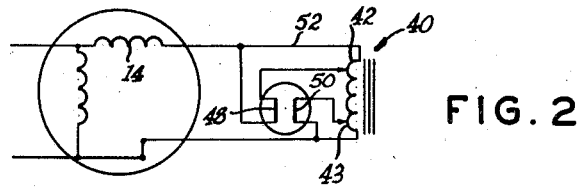

Fig. 2 shows a modified starting circuit in accordance with the present invention where both electrode strata of the capacitor are heated. In this way twice as much heat can be applied so that the warm-up time of the capacitor can be halved, or the heating current can be reduced without increasing the warm-up time. In the construction of Fig. 2 an autotransformer 40 is used, with one end of the winding acting as a secondary 42 whose terminals are connected to the respective ends of foil 48. The other end of the winding can be connected as another secondary 43 to the respective ends of the wound electrode 50. Instead of having the heating transformer supplied in parallel to the starting winding, the construction of Fig. 2 has this transformer connected by lead 52 in series with that winding. In this way the voltage at the transformer primary is somewhat reduced below the power supply voltage and this winding will, therefore, be less expensive to provide.

In the operation of the construction of Fig. 2, the closing of the power supply circuit to the motor when the capacitor has very little capacitance, will automatically cause current to pass through the starting winding and the transformer thereby supplying heat to both electrodes. As soon as the heat brings the capacitance up sufficiently far, the capacitance will automatically shunt the transformer so that the current through the starting winding will go principally through the capacitor. This will supply the starting torque for the motor and simultaneously reduce the heating supplied by the transformer heating circuit. The motor of Fig. 2 otherwise operates in exactly the same fashion as the motor of Fig. 1.

If desired the transformer in the construction of Fig. 2 can be of the type using separate windings or alternately the transformer of Fig. 1 can be of autotransformer type. Similarly the construction of Fig. 2 can have its transformer in parallel with the starting winding and the transformer of Fig. 1 can be energized in series.

Figure 3:
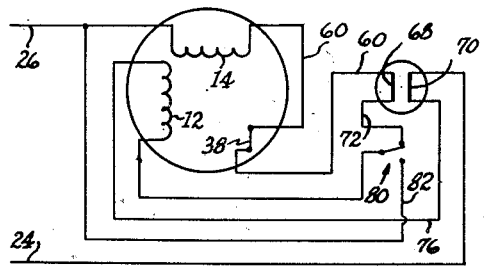

Fig. 3 shows a further form of the invention in which no separate heating transformer is used, the circuit being arranged so that the motor windings are connected in series to form a heating current impedance for the electrodes. As shown in Fig. 1, starting winding 14 can for this purpose be connected between power supply lead 26 and another lead 60 that extends to one end of one capacitor electrode 68, by way of the centrifugal switch 38 for example. The other end of this electrode 68 is connected by lead 72 to a fixed contact of a single-pole double-throw switch 80. The pole or movable armature of the switch is in turn connected by lead 74 through running winding 12 and by another lead 76 to one end of electrode 70. The other end of this electrode 70 is shown as directly returned to a second power supply conductor 24. The second fixed contact of switch 80 is connected directly by lead 82 to the first power supply conductor 26. Switch 80 can be either arranged to automatically respond to the temperature of the capacitor in the manner indicated for example for switch 34 in the construction of Fig. 1, or it can be of the ordinary time delay type that can be manually moved to the illustrated position and after a short time interval will automatically trip to the other position in which its armature is held against lead 82. If desired, the switch can even be of very simple type in which the armature has to be manually moved to both of its positions.

With any of the above types of switches, the motor is arranged so that at extremely low temperatures switch 80 is in the illustrated position when the power supply is closed. Where switch 80 is of the manually operated type, it can be coupled with or placed adjacent the main starting switch for convenience of operation. Upon energization, current will pass in series through both motor windings as well as both electrode strata. As soon as there is sufficient heating of the capacitor, switch 80 is moved to its other position thereby permitting the capacitance of the capacitor to directly return lead 60 to the power supply conductor 24. At the same time, the running winding 12 will have one end connected between power supply conductor 26 and its other end will remain connected through electrode 70 to the other power supply lead 24. Since in normal operation the running winding will carry a relatively small amount of current by reason of the back EMF induced by the rotation of the motor, the current passing through electrode 70 at that time will not do much heating. If desired, however, switch 80 can be provided with a separate blade to shunt the ends of this electrode.

After switch 80 is tripped, the operation of the motor will follow that described above. The electrical resistance provided by the capacitor can also be increased if desired by incorporating in it a third or floating electrode. This is particularly desirable with capacitors that are used with motors energized by power supplies having a potential of 220 volts or higher. The floating electrode can in this way be inserted between the two terminal electrode strata so that the potential between the floating electrode and either of the strata will only be half of the overall voltage across the capacitor. Each terminal electrode can accordingly be provided with an oxide surface formed so as to withstand the lower voltage. Such formation makes the entire capacitor somewhat less expensive to construct. In addition a floating electrode can be made relatively thin, as little as ½ or even ¼ of a mil in thickness, so that it exhibits a resistance many times that of either or both the terminal electrodes. Also since the floating electrode can be a simple foil not covered with oxide, it can be made somewhat longer than other electrodes without materially increasing the cost of production. Where the capacitor is of the convolutely wound construction, two floating foils are generally provided since the winding operation places the terminal electrode strata in juxtaposition at each of their faces. In other words one face of one electrode is initially juxtaposed against one face of the second electrode, but the next turn of the winding brings the outer face of the first electrode against the outer face of the second electrode. Unless one of these juxtapositions provides no capacitance (as for example where the electrodes are insulated from each other) a floating foil should be provided in both of these juxtaposed locations if the electrodes have oxide surfaces that withstand only half the overall potential. Only one floating electrode need be used where these oxide surfaces withstand the full overall potential.

Figure 4:
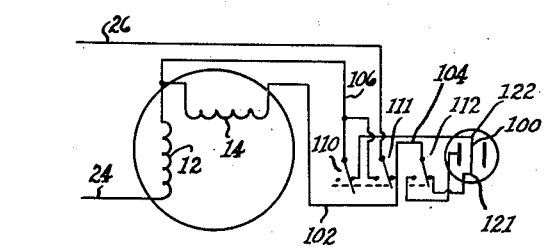

Fig. 4 shows a modified construction in which the capactor has such a floating foil 100. Although this floating foil can be heated in the manners shown in Figs. 1, 2 and 3, it is shown in Fig. 4 as supplied with heating current by a transformer made up of the motor windings themselves. Inasmuch as these windings are wound through the grooves of a stator which makes a very good magnetic core, the windings can be connected either as an autotransformer, or as primaries and secondaries of conventional type of transformers. In the figure they are connected in series to make an autotransformer. The outer end of running winding 12 is connected to power supply lead 24 and the outer end of the starting winding 14 is connected by lead 102 and a switch section 111, to the other power supply connector 26. An auxiliary lead 104 connects lead 102 through another switch section 112 to one end 121 of floating electrode 100. The other end 122 of this electrode is connected through a third switch section 110 to lead 106 which extends to the junction between the windings 12, 14. Another auxiliary lead 108 suitably interconnects switch sections 110, 111 as shown.

In the operation of the construction of Fig. 4, the closing of the power supply circuit, when the capacitor is too cold, takes place with the switch sections in the illustrated position thereby connecting the windings 12, 14 in series across the power supply. In addition the starting winding 14 is connected through sections 110 and 112 across the floating electrode 100. The effect of the autotransformer action is to lower the impedance of the transformer output so that it will more closely match the resistance of the floating electrode and more effective heating can be obtained. Furthermore, the autotransformer operation causes the heating current supplied by winding 14 to be oppositely phased with respect to the energizing current delivered by the power supply, so that the resultant current in the starting winding is fairly low and its fine windings will not be too seriously overheated.

When the capacitor comes up to temperatures, or after a suitable time delay as indicated above, the switch sections are moved to their opposed positions. Sections 110 and 112 thereby disconnect the floating electrode from the circuit while section 112 also completes the power supply connection between one terminal electrode and the outer end of starting winding 14. Switch section 111 connects the junction of the two windings to the power supply lead 26 thereby completing the circuit and energizing the motor for rotation. Although the motor of Fig. 4 is shown as a capacitor-run motor that does not have a centrifugal switch but keeps the capacitor connected even during the running, the circuit can also be used with a motor in which the starting winding is switched off when it has come to the desired speed as in the other constructions.

As many apparently widely different embodiments of this invention may be made without departing from the spirit and scope hereof, it is to be understood that the invention is not limited to the specific embodiments hereof except as defined in the appended claims.

What is claimed is:

1. A low temperature capacitive type motor starting combination including an electrolytic capacitor for providing the motor with out-of-phase currents, a heating circuit, and a starting switch mechanism connected to the capacitor and to the heating circuit to switch the heating circuit to the capacitor when the combination is set for starting the motor, and to automatically switch off at least most of the heating circuit by the time the motor has come up to operating speed.

2. The combination of claim 1 in which the capacitor has electrode strata at least one of which has a length to width ratio of at least 40:1, and is inserted in the heating circuit as a resistance element that carries the heating current from one of its ends to the other.

3. The combination of claim 1 in which the capacitor has at least one electrode stratum in the form of a metallic coating sprayed on an electrically non-conductive support.

4. The combination of claim 1 in which the capacitor has at least one electrode stratum in the form of a metallic coating sprayed on an electrically non-conductive porous support.

5. A low temperature capacitive type motor starting combination including an electrolytic capacitor for providing the motor with out-of-phase currents, said capacitor having electrode strata, a heating device including a step-down transformer, and starting switch mechanism connected to the transformer and to the capacitor to insert at least one of the strata as a resistance element in the output of the transformer when power is supplied to the motor.

6. A low temperature capacitive type motor starting combination for motors having a starting winding and a running winding, said combination including an electrolytic capacitor for providing the motor with out-of-phase currents, said capacitor having electrode strata, and a switching circuit connected to the capacitor to insert at least one of the strata as a heating element in series with the starting winding when power is supplied to the motor.

No references cited.